(12) United States Patent
Yuen et al.

(10) Patent No.: US 8,320,491 B2
(45) Date of Patent: Nov. 27, 2012

(54) METHOD AND SYSTEM FOR ENCODING A DATA MATRIX AND METHOD AND SYSTEM FOR DECODING AN ENCODED DATA MATRIX

(75) Inventors: Chau Yuen, Singapore (SG); Sumei Sun, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 800 days.

(21) Appl. No.: 12/514,440

(22) PCT Filed: Nov. 13, 2007

(86) PCT No.: PCT/SG2007/000388
§ 371 (c)(1),
(2), (4) Date: May 11, 2009

(87) PCT Pub. No.: WO2008/060246
PCT Pub. Date: May 22, 2008

(65) Prior Publication Data
US 2010/0061429 A1    Mar. 11, 2010

Related U.S. Application Data

(60) Provisional application No. 60/865,534, filed on Nov. 13, 2006.

(51) Int. Cl.
*H04L 27/00* (2006.01)
*H04B 7/02* (2006.01)
(52) U.S. Cl. ........................................................ 375/267
(58) Field of Classification Search .................. 375/259, 375/260, 267, 295, 316
See application file for complete search history.

(56) References Cited

U.S. PATENT DOCUMENTS
2005/0213686 A1   9/2005  Love et al.
2007/0160011 A1*  7/2007  Kim et al. ..................... 370/332

FOREIGN PATENT DOCUMENTS
EP           1400954 A2    3/2004

* cited by examiner

*Primary Examiner* — Kevin M Burd
(74) *Attorney, Agent, or Firm* — Fliesler Meyer LLP (57) ABSTRACT

According to one embodiment of the invention, a method for encoding a data matrix having at least a first component and a second component is provided wherein the value of the first component is determined, the number of bits to be used for encoding the second component is selected based on the value of the first component, the second component is encoded using the selected number of bits, and the first component is encoded.

17 Claims, 5 Drawing Sheets

METHOD AND SYSTEM FOR ENCODING A DATA MATRIX AND METHOD AND SYSTEM FOR DECODING AN ENCODED DATA MATRIX

FIELD OF THE INVENTION

Embodiments of the invention generally relate to a method and a system for encoding a data matrix and a method and a system for decoding an encoded data matrix.

BACKGROUND OF THE INVENTION

According to the Multiple-input Multiple-output (MIMO) communication technology, multiple transmit antennas of a transmitter and multiple receive antennas of a receiver are used for the transmission of a data stream from the transmitter to the receiver. MIMO has been considered in several communication standards in order to achieve a higher throughput. Although open-loop MIMO techniques have already shown to achieve high performance gain, the availability of either full or partial channel state information (CSI) at the transmitter, e.g. a base-station of a mobile communication network, typically leads to additional performance gain and sometimes even complexity reduction. Such closed-loop schemes have been considered in IEEE 802.11n, IEEE 802.16, and 3GPP Long Term Evolution (LTE) for application of beamforming or multi-user precoding.

However, channel state information estimation for the downlink channel at a base-station is not possible in communication systems using FDD (frequency division duplexing), and it is also not straight forward in communication systems using TDD (time division duplexing) due to the mismatch in the radio frequency front end. Hence, the channel state information is typically estimated by the receiving mobile terminal, quantized, and sent back to the base-station. This, unfortunately, requires a high feedback bandwidth. So, the mobile terminal may compute a beamforming vector or matrix, which is usually a unit norm vector or unitary matrix, and compress this vector or matrix before feeding it back to the base-station. By compression and quantization the feedback bandwidth requirement may be greatly reduced.

The feedback bandwidth saving is even more substantial for communication systems employing OFDM (orthogonal frequency division multiplexing). For communication systems according to IEEE 802.11n with 20 MHz bandwidth, 52 data sub carriers are allocated for the transmission of data streams. Then a 4 bits feedback per sub carrier will require 208 bits, a 6 bits feedback per sub carrier will require 312 bits (which is 50% increment over 4 bits case), and a 8 bits feedback per sub carrier will require 416 bits (which is 100% increment over 4 bits case). To feedback a few hundreds of bits in a timely manner to a base-station will pose a challenging task, hence a low complexity scheme that can provide good performance at low feedback rate is highly desirable.

SUMMARY OF THE INVENTION

According to one embodiment of the invention, a method for encoding a data matrix having at least a first component and a second component is provided wherein the value of the first component is determined, the number of bits to be used for encoding the second component is selected based on the value of the first component, the second component is encoded using the selected number of bits, and the first component is encoded.

SHORT DESCRIPTION OF THE FIGURES

Illustrative embodiments of the invention are explained below with reference to the drawings.

DETAILED DESCRIPTION

Figure 1:
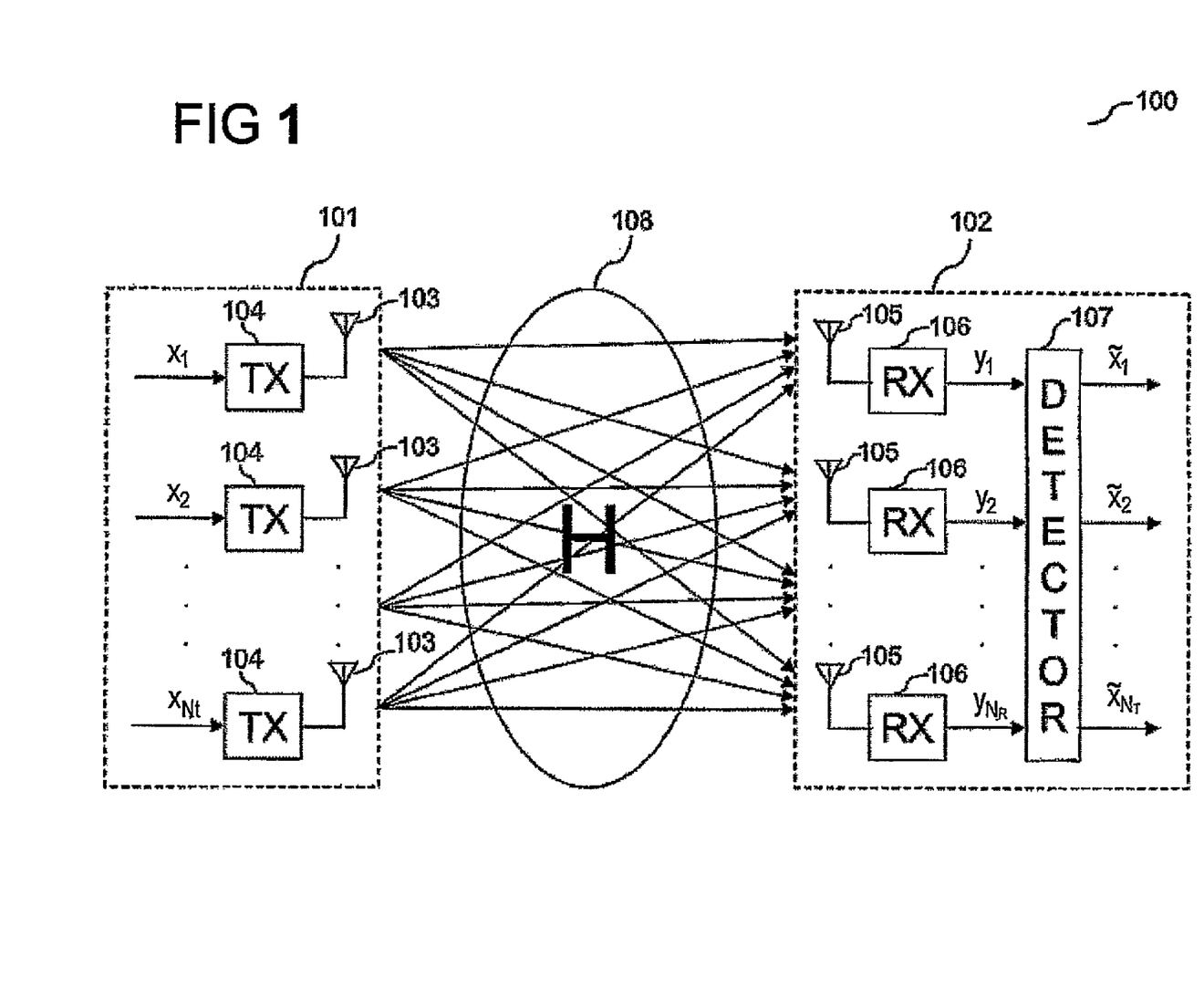
FIG. 1 shows a communication system according to an embodiment of the invention.

FIG. 1 shows a communication system 100 according to an embodiment of the invention.

The communication system 100 includes a transmitter 101 and a receiver 102. The transmitter 101 includes a plurality of transmit antennas 103, each transmit antenna 103 being coupled with a respective sending unit 104.

Each sending unit 104 is supplied with a component of a $N_T \times 1$ signal vector $x=[x_1, x_2, \ldots, x_{N_T}]^T$ where $N_T$ is the number of transmit antennas 103. Each sending unit 104 transmits the respective component of the signal vector x using the respective antenna 103, such that altogether, the signal vector x is sent. The transmitted signal vector is received by the transmitter 102 by a plurality of receive antennas 105, each receive antenna 105 being coupled with a respective receiving unit 106, in form of the received $N_R \times 1$ signal vector $y=[y_1, y_2, \ldots, y_{N_R}]^T$ via a communication channel 108. $N_R$ denotes the number of receive antennas 105.

Since $N_R$ and $N_T$ are assumed to be bigger than one, the Communication system 100 is a MIMO (multiple-input multiple-output) system, for example a MIMO-OFDM (orthogonal frequency division multiplexing) system with $N_T = N_R = 4$ or 8 and working at a center frequency of 5 GHz with a system bandwidth of 20 MHz.

Each receive antenna 105 receives one component of the received signal vector y and the respective component is output by the receiving unit 106 coupled to the antenna and fed to a detector 107.

The transmission characteristics of the communication channel 108 between the transmit antennas 103 and the receive antennas 105 can be modeled by a complex $N_R \times N_T$ channel matrix H.

The received signal vector y can be written as $$y = H \cdot x + n \qquad (1)$$

where n is a complex Gaussian noise vector with zero mean and variance $\sigma_v^2$.

For example, the communication system 100 is a communication system according to Wifi IEEE 802.11n, WiMax IEEE 8.02.16, or 3GPP LTE (Third Generation Partnership Project Long Term Evolution). For instance, the communication system 100 uses OFDM (orthogonal frequency division multiplexing).

The communication system 100 may use beamforming for the data transmission. As an example, eigen-subspace beamforming is explained in the following. With eigen-beamforming, a performance gain and simple decoding can be achieved.

By using Singular Value Decomposition (SVD), the MIMO channel matrix H can be decomposed according to $$H = UDV^H \qquad (2)$$

where U of size $N_R \times R$ and V of size $N_T \times R$ are both unitary matrices, and D is a R×R diagonal matrix consisting of the singular values of H as its diagonal elements, and R is the rank of H.

To perform eigen-subspace beamforming, V needs to be fed back from the receiver, e.g. a mobile terminal, to the transmitter, e.g. a base-station of a mobile communication network. In order to reduce the amount of information in V, V may be multiplied with a matrix $\Sigma$ such that the last row of V consists of only real numbers.

Hence, equation (2) may be expressed as:

$$\underline{H} = UD\Sigma \overline{V}^H \qquad (3)$$
$$= \overline{UDV}^H$$

where $\overline{D} = D\Sigma$ and $\overline{V} = V\Sigma$ and where $$\underline{\Sigma} = \text{diag}[\exp\{j * \arg(\underline{v}_{N_T}^H)\}] \qquad (4)$$

and $\overline{v}_{N_T}^H$ represents the last column of $\nabla^H$.
Thus, $$\underline{y} = \underline{Hx} + \underline{n} \qquad (5)$$
$$= (\underline{UDV}^H)\underline{x} + \underline{n}$$
$$= (\underline{UD\Sigma \overline{V}}^H)\underline{x} + \underline{n}$$

To transmit data on the first K eigen modes (where $K \leq R$), the beamforming matrix W is defined as the first K column vectors of $\overline{V}$, i.e., $$W = \overline{V}(1:K) \qquad (6)$$

The transmitted signal x is related to the K×1 data signal u by:

$$x = Wu \qquad (7)$$

The bandwidth of the feedback channel, i.e. the communication channel used by the receiver 102 to feed back channel state information to the transmitter is limited so W has to be quantized, and the transmitter 101 receives the quantized version of W, denoted as $\hat{W}$.

It is desirable that the quantization of W is simple in implementation and low in complexity, has low storage requirements and is flexible with respect to an adjusting of the antenna setting.

It is assumed that the communication channel 108 is estimated accurately, and that there is no error or delay in the feedback communication channel, so in the following, only the impact, of the quantization error due to the limited feedback bandwidth is considered. Hence $\hat{W}$, instead of W, is being used as beamforming matrix by the transmitter 101.

In the following description, only eigen-beamforming based on SVD (singular value decomposition) is used as an example, however, other types of beamforming methods may be used according to other embodiments of the invention.

According to one embodiment of the invention, a feedback scheme is used which uses Givens rotations for the compression of the matrix W. According to Givens rotations, a unitary matrix, such as W in this case, can be represented as follows:

$$\underline{W} = \prod_{i=1}^{\min(N_T-1,K)} \left[ D_i(1_{i-1} e^{j\phi_{1,i}} \cdots e^{j\phi_{N-1,i}}) \prod_{l=i+1}^{N_T} \underline{G}_{li}^T(\psi_{li}) \right] \times I_{N_T} \times K \qquad (9)$$

where $D_i$ is a diagonal matrix and $G_{li}$ is defined as:

$$\underline{G}_{li}(\psi_{li}) = \begin{bmatrix} I_{i-1} & 0 & 0 & 0 & 0 \\ 0 & \cos(\psi_{li}) & 0 & \sin(\psi_{li}) & 0 \\ 0 & 0 & I_{l-i-1} & 0 & 0 \\ 0 & -\sin(\psi_{li}) & 0 & \cos(\psi_{li}) & 0 \\ 0 & 0 & 0 & 0 & I_{N_T-1} \end{bmatrix} \qquad (10)$$

where $I_k$ denotes the k-dimensional unity matrix.

For example, a 4×2 unitary matrix W can be written as $$\underline{W} = \begin{bmatrix} 1 & 0 & 0 & 0 \\ 0 & e^{j\phi_{21}} & 0 & 0 \\ 0 & 0 & e^{j\phi_{31}} & 0 \\ 0 & 0 & 0 & e^{j\phi_{41}} \end{bmatrix} \times \underline{G}_{21}^T(\psi_{21}) \underline{G}_{31}^T(\psi_{31}) \underline{G}_{41}^T(\psi_{41}) \times \qquad (11)$$

$$\begin{bmatrix} 1 & 0 & 0 & 0 \\ 0 & 1 & 0 & 0 \\ 0 & 0 & e^{j\phi_{32}} & 0 \\ 0 & 0 & 0 & e^{j\phi_{42}} \end{bmatrix} \times \underline{G}_{32}^T(\psi_{32}) \underline{G}_{42}^T(\psi_{42}) \times \begin{bmatrix} 1 & 0 \\ 0 & 1 \\ 0 & 0 \\ 0 & 0 \end{bmatrix}$$

Therefore, a 4×2 unitary matrix W can be fully described by only ten parameters: $\phi_{11}, \phi_{21}, \phi_{31}, \psi_{21}, \psi_{31}, \psi_{41}, \phi_{22}, \phi_{32}, \psi_{32}, \psi_{42}$.

In table 1, the Givens rotation parameters necessary for the description of a matrix using Givens rotations for various dimensions of the matrix are given.

TABLE 1

| Dimension of $\underline{W}$ | Number of parameters | Parameters |
|---|---|---|
| 2 × 1 | 2 | $\phi_{11}, \psi_{21}$ |
| 2 × 2 | 2 | $\phi_{11}, \psi_{21}$ |
| 3 × 1 | 4 | $\phi_{11}, \phi_{21}, \psi_{21}, \psi_{31}$ |
| 3 × 2 | 6 | $\phi_{11}, \phi_{21}, \psi_{21}, \psi_{31}, \phi_{22}, \psi_{32}$ |
| 3 × 3 | 6 | $\phi_{11}, \phi_{21}, \psi_{21}, \psi_{31}, \phi_{22}, \psi_{32}$ |
| 4 × 1 | 6 | $\phi_{11}, \phi_{21}, \phi_{31}, \psi_{21}, \psi_{31}, \psi_{41}$ |
| 4 × 2 | 10 | $\phi_{11}, \phi_{21}, \phi_{31}, \psi_{21}, \psi_{31}, \psi_{41}, \phi_{22}, \phi_{32}, \psi_{32}, \psi_{42}$ |
| 4 × 3 | 12 | $\phi_{11}, \phi_{21}, \phi_{31}, \psi_{21}, \psi_{31}, \psi_{41}, \phi_{22}, \phi_{32}, \psi_{32}, \psi_{42}, \phi_{33}, \psi_{43}$ |
| 4 × 4 | 12 | $\phi_{11}, \phi_{21}, \phi_{31}, \psi_{21}, \psi 31, \psi_{41}, \phi_{22}, \phi_{32}, \psi_{32}, \psi_{42}, \phi_{33}, \psi_{43}$ |

The number of bits assigned to the Givens rotation parameters, i.e. the number of bits to be used to encode the respective parameter, according to the IEEE 802.11n draft is summarized in table 2, where $b_\psi$ represents the number of bits assigned to $\psi$, and $b_\phi$ is the number of bits assigned to $\phi$. An unequal bit assignment is used due to the different ranges of $\psi$ and $\phi$. $\psi$ has a range from 0 to $\pi/2$, while $\phi$ has a range from 0 to $2\pi$.

TABLE 2

| $b_\psi$ | $b_\phi$ |
|---|---|
| 1 | 3 |
| 2 | 4 |
| 3 | 5 |
| 4 | 6 |

Using a bit assignment for ψ and φ as for example given by table 2, $\tilde{\psi}$ and $\tilde{\phi}$ can be quantized according to (12) and (13) (where $\tilde{\psi}$ and $\tilde{\phi}$ represent the quantized version of ψ and φ). The beamforming matrix $\tilde{W}$ can then be recovered at the transmitter 101 according to (14).

$$\tilde{\psi} = \frac{k\pi}{2^{b_\psi+1}} + \frac{\pi}{2^{b_\psi+2}} \text{ where } k = 0, 1, \ldots, 2^{b_\psi}-1 \quad (12)$$

$$\tilde{\phi} = \frac{k\pi}{2^{b_\phi-1}} + \frac{\pi}{2^{b_\phi}} \text{ where } k = 0, 1, \ldots, 2^{b_\phi}-1 \quad (13)$$

$$\underline{\tilde{W}} = \prod_{i=1}^{\min(N_T-1,K)} \left[ \underline{D}_i \left( 1_{i-1} e^{j\tilde{\phi}_{1,i}} \ldots e^{j\tilde{\phi}_{N_T-1,i}} \right) \prod_{l=i+1}^{N_T} \underline{G}_{li}^T(\tilde{\psi}_{li}) \right] \times I_{N_T \times K} \quad (14)$$

A desired property of the quantization of the beamforming matrix $\tilde{W}$ may for example be that the diagonal elements of the matrix $\tilde{W}W$ are maximized and the off-diagonal elements of the matrix $\tilde{W}W$ are minimized.

According to one embodiment of the invention, the number of bits assigned to a vector (or matrix) component is not fixed but depends on the size of another vector or matrix component.

Figure 2:
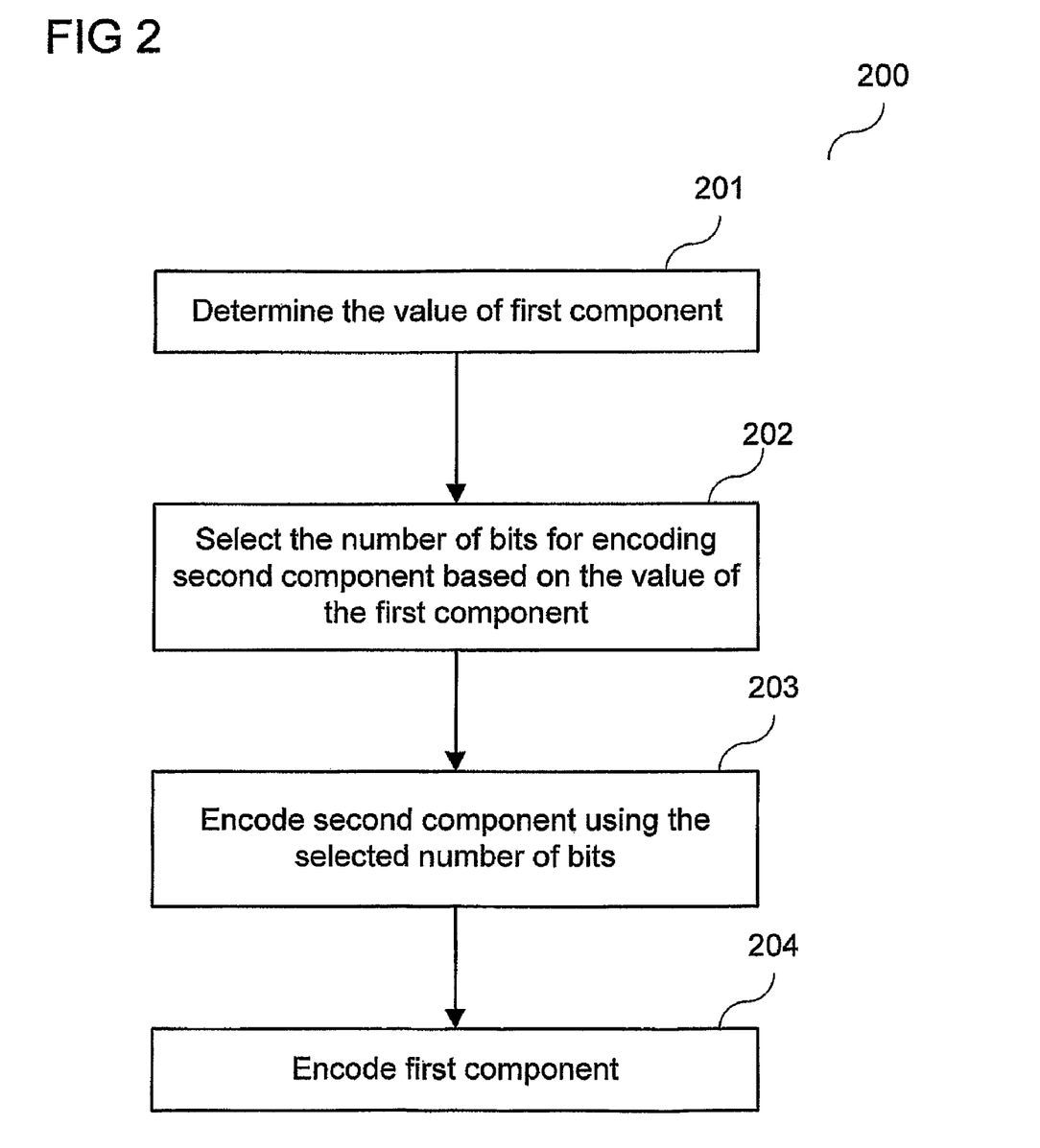
FIG. 2 shows a flow diagram according to an embodiment of the invention.

A method for encoding a data matrix having at least a first component and a second component according to one embodiment of the invention is illustrated in FIG. 2.

FIG. 2 shows a flow diagram according to an embodiment of the invention.

In 201, the value of the first component is determined.

In 202, the number of bits to be used for encoding the second component is selected based on the value of the first component.

In 203, the second component is encoded using the selected number of bits.

In 204, the first component is encoded.

Note that the order in which the first component and the second component are encoded is not limited, i.e. 204 may be carried out before (or simultaneously to) 203.

The size of a component is for example the absolute value of the component in the case of a real or complex component. The size of a component may also be some norm (e.g. the Euclidian norm) of a component in case that the component is itself a matrix.

The number of bits to be used for encoding the second component is for example selected based on the size of the first component. In one embodiment, the number of bits to be used for encoding the second component is selected based on the absolute value of the first component.

The data matrix is for example a data vector.

In one embodiment, the first component and the second component include angle (or angular) information.

According to one embodiment of the invention, the second component is a parameter including angular information of a representation of the data matrix or another data matrix. For example, the representation is a representation according to Givens rotations.

The data matrix for example includes channel state information. For example, the data matrix is a beamforming matrix.

The data matrix is for example encoded by a receiver of a communication system to be transmitted to a transmitter of the communication system. The data matrix may thus be a matrix including channel state information, in other words information about a communication channel between the receiver and the transmitter, e.g. information specifying transmission characteristics of the communication channel, that is fed back from the receiver to the transmitter.

The communication system is for example a multiple-input multiple-output communication system.

Figure 3:
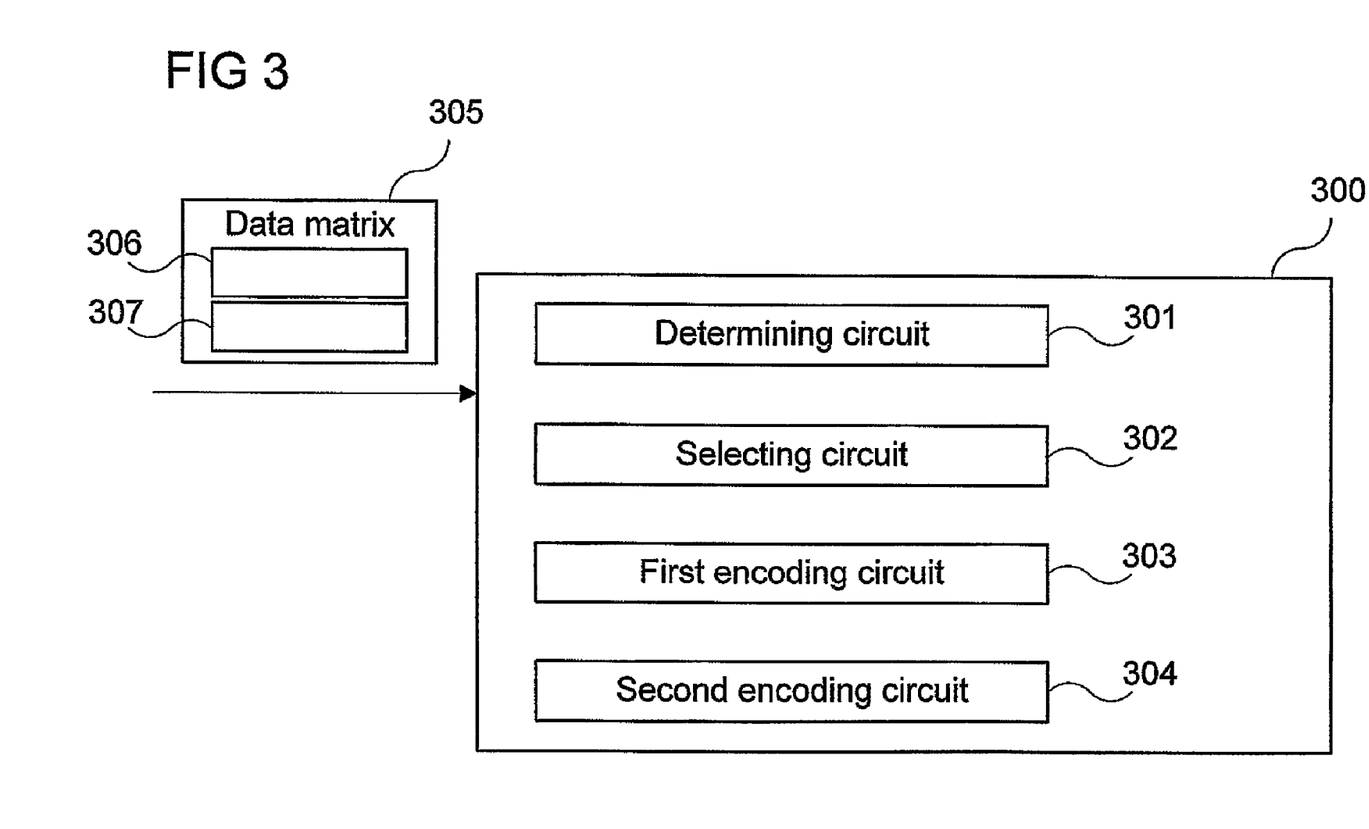
FIG. 3 shows an encoder according to an embodiment of the invention.

An encoder for example carrying out the method illustrated in FIG. 2 is illustrated in FIG. 3.

FIG. 3 shows an encoder 300 according to an embodiment of the invention.

The encoder 300 is an encoder for encoding a data matrix 305 having at least a first component 306 and a second component 307, which the encoder 300 for example receives as input.

The encoder 300 includes a determining circuit 301 configured to determine the value of the first component and a selecting circuit 302 configured to select the number of bits to be used for encoding the second component 307 based on the value of the first component 306.

The encoder 304 further includes a first encoding circuit 303 configured to encode the second component 307 using the selected number of bits and a second encoding circuit 305 configured to encode the first component 306.

The encoder 300 is for example part of a transceiver, e.g. a multiple-input multiple-output transceiver.

The first encoding circuit may be the same as the second encoding circuit.

A circuit can be a hardware circuit, e.g. an integrated circuit, designed for the respective functionality or also a programmable unit, such as a processor, programmed for the respective functionality. A processor may for example be a RISC (reduced instruction set computer) processor or a CISC (complex instruction set computer).

According to other embodiments of the invention a method and a decoder for decoding an encoded first component and an encoded second component of an encoded data matrix according to the method described with reference to FIG. 2 and the encoder described with reference to FIG. 3 are provided.

A decoder for decoding an encoded first component and an encoded second component of an encoded data matrix is for example part of a transceiver, e.g. for decoding channel state information fed back to the transceiver.

In one embodiment, simple direction quantization is used for the quantization of vector (or generally matrix) components. The bit assignment to components of vectors (e.g. vectors holding channel state information) may vary from vector to vector and for example depend on geometric properties of the vectors such that for example, a high resolution of dense areas is achieved, i.e. such that for subsets of the vector space of which the vectors to be coded are elements (e.g. $C^n$) in which a lot of the vectors to be coded can occur can be coded with higher spatial resolution than subsets where fewer vectors can occur.

In one embodiment, the method for encoding of a matrix illustrated in FIG. 2 is applied to a matrix expressed with Givens rotations. For example, the bit assignment to one of the φ is based on the value of one of the ψ. The method can also be applied to other applications where a quantization of matrix or vector components is carried out. Note that as examples, components of vectors (i.e. matrices with only one column) are quantized. However, embodiments of the invention can also be applied for quantization of components of matrices with more than one column, in particular, a matrix may be split into its columns and each column may be interpreted as a matrix (with only one column) the components of which are quantized.

As an example, it is explained in the following how a 2×1 unit-norm beamforming vector w is encoded according to one embodiment. It is assumed that the second component is real (e.g. this is achieved by multiplication with a matrix as was explained with reference to equation (3)) such that w can be written as $$w = \begin{bmatrix} w_1 \\ w_2 \end{bmatrix}$$

$$= \begin{bmatrix} r_1 e^{j\phi_{11}} \\ r_2 \end{bmatrix} \text{(Geometry view point)}$$

$$= \begin{bmatrix} \cos\psi_{21} e^{j\phi_{11}} \\ \sin\psi_{21} \end{bmatrix} \text{(Givens Rotation view point)}$$

(15)

Due to unit norm property, w satisfies $w_1^2 + w_2^2 = 1$ $\Rightarrow r_1^2 + r_2^2 = 1$ (16)

In addition, there is a matching between the Givens rotation view point and the Geometry view point since $r_1$ and $r_2$ are related to $\psi_{21}$ by $r_1 = \cos(\psi_{21})$ and $r_2 = \sin(\psi_{21})$.

Based on the geometry view point in (15) and the constraints according to (26), the following can be seen:

When $r_2$ is large (and accordingly, $\psi_{21}$ is large, i.e. close to $$\frac{\pi}{2}$$

or $$-\frac{\pi}{2},$$

i.e. the absolute value of $\psi_{21}$ is close to $$\frac{\pi}{2}),$$

$r_1$ is small. Therefore it is possible to encode $\phi_{11}$ with low resolution without a great loss of accuracy.

When $r_2$ is small (and accordingly, $\psi_{21}$ is small, i.e. close to 0), $r_1$ is large. Therefore it is desirable in view of accuracy that $\phi_{11}$ is encoded with high resolution.

Therefore, in one embodiment, the number of bits assigned to encode $\phi_{11}$ is a function of $r_1$ and $r_2$, which are in turn related to the value of $\psi_{21}$ when Givens rotations are used.

Figure 4:
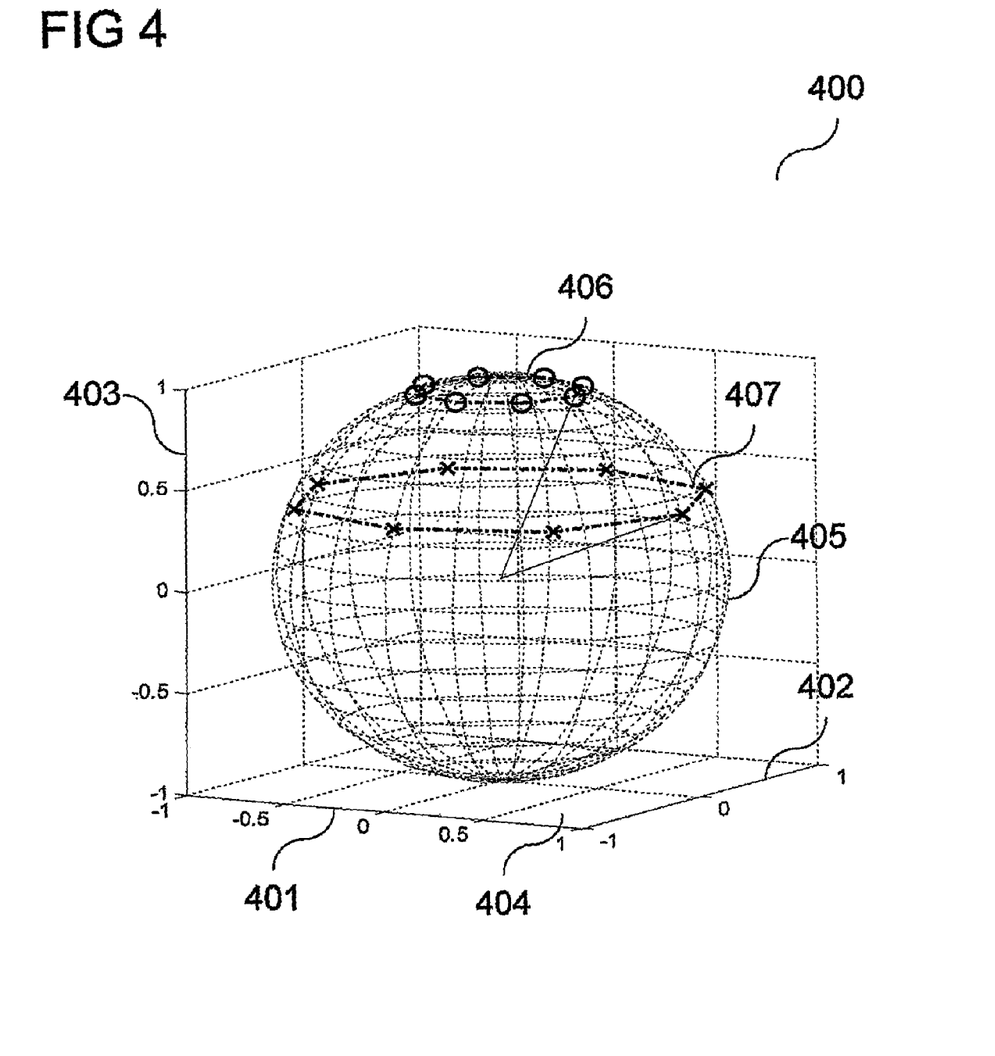
FIG. 4 shows a three-dimensional coordinate system.
Figure 5:
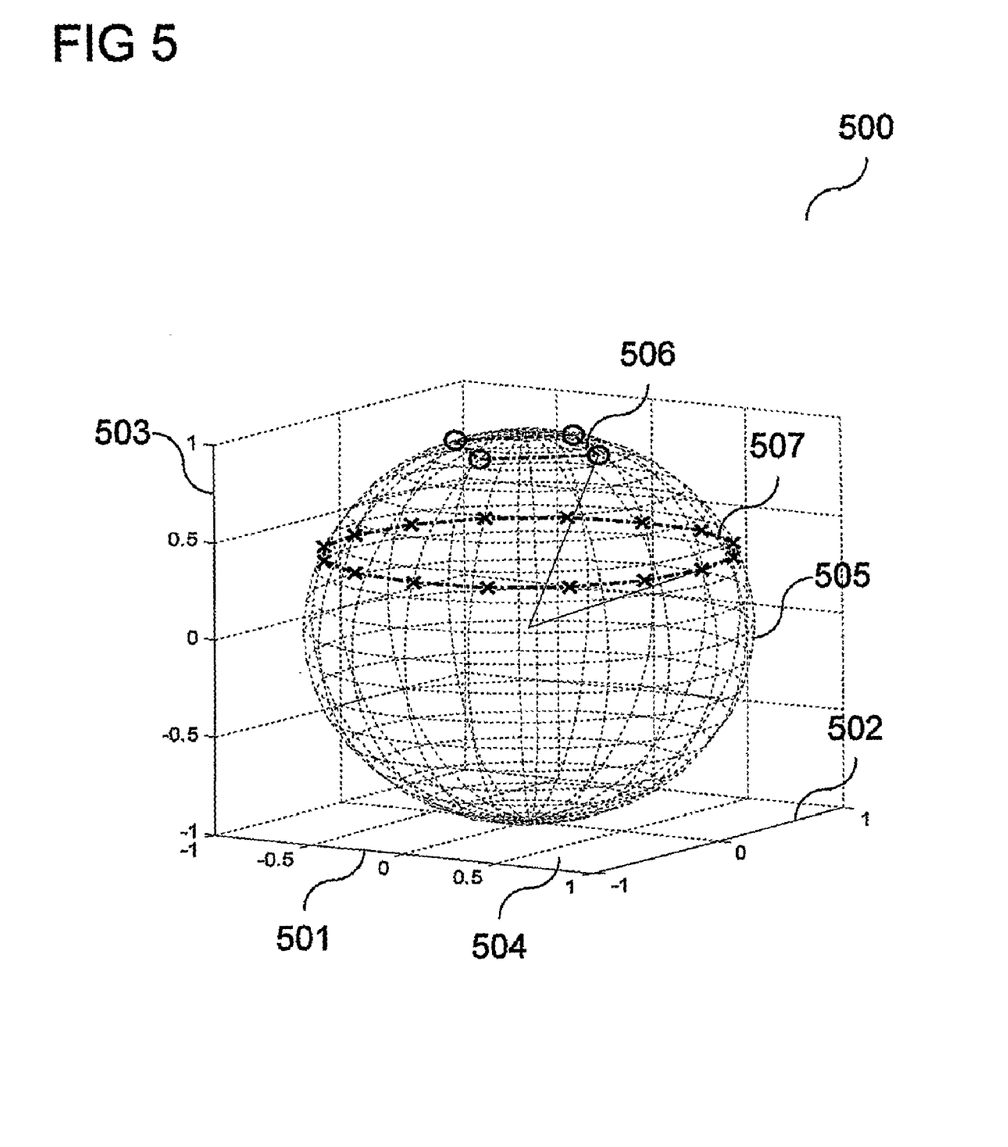
FIG. 5 shows a three-dimensional coordinate system.

For a better understanding, FIGS. 4 and 5 illustrate the geometrical interrelation of the parameters of the vector w.

FIG. 4 shows a three-dimensional coordinate system 400.

The coordinate system 400 includes a first axis 401, a second axis 402 and a third axis 403. The first axis 401 and the second axis 402 define a plane 404. The complex number $r_1 e^{j\phi_{11}}$ (the first component of w) corresponds to a point in this plane 404. The second component of w, assumed to be real, corresponds to a point on the third axis 403.

Together, the first component and the second component of w define a point on a sphere 405 because of the constraint (16). Consider two different (positive) values for $r_2$ (note that two possible values for $r_2$ corresponds to a one bit assignment for $\psi_{21}$). One value (the larger value) defines a first circle 406 on the sphere 405 and the other value (the smaller value) defines a second circle 407 on the sphere 405.

The radii of the two circles 406, 407 correspond to the value $r_1$. It can be seen that if $r_2$ is small, $r_1$ is large (second circle 407) and that if $r_2$ is large, $r_1$ is small (first circle 406). A point on the second circle 407 to which the vector w may correspond is indicated by an "x" and a point on the first circle 406 to which the vector w may correspond is indicated by an "o" in FIG. 4. Note that in this example, there are 8 points per circle. This means that for both values of $r_2$ (i.e. for $\psi_{21}$), 3 bits are allocated for $\phi_{11}$. The total number of bits to represent w is 1+3=4 bits.

It can be seen that the points on the first circle 406 are closer to each other compared to the points on the second circle 407.

To achieve a lower (average) quantization error, according to one embodiment of the invention, the number of bits assigned to $\phi_{11}$ is selected according to the value of $r_1$. An example for a possible bit assignment for w is illustrated in FIG. 5.

FIG. 5 shows a three-dimensional coordinate system 500. Similar to the coordinate system 400 shown in FIG. 4, the coordinate system 500 includes a first axis 501, a second axis 502 and a third axis 503. The first axis 501 and the second axis 502 define a plane 504. The complex number $r_1 e^{j\phi_{11}}$ (the first component of w) corresponds to a point in this plane. The second component of w, assumed to be real, corresponds to a point on the third axis 503.

As in FIG. 4, the complex number $r_1 e^{j\phi_{11}}$ (the first component of w) corresponds to a point in the plane 504. As above, it is assumed that $r_2$ may have two different values for $r_2$, i.e. a one bit assignment is used for $\psi_{21}$. As above, a value of $r_2$ corresponds to a point on the third axis 503. The larger value of $r_2$ defines a first circle 506 on a sphere 505 and the smaller value of $r_2$ defines a second circle 507 on the sphere 505. The sphere 505, as in FIG. 4, is the set of points fulfilling constraint (16).

The number of bits assigned for $\phi_{11}$ is in this example selected depending on the size of $r_2$. For example, two bits are assigned for $\phi_{11}$ when $r_2$ is large (i.e. $\psi_{21}$ is large) and w lies on the first circle 506, and four bits are assigned to $\phi_{11}$ when $r_2$ is small (i.e. $\psi_{21}$ is small) and w lies on the second circle 507. Note that this can also be seen as a bit assignment depending on $r_1$ since $r_2$ is large if $r_1$ is small (first circle 506) and $r_2$ is small if $r_1$ is large (second circle 507).

Due to this bit assignment, there are four possible points for w on the first circle 506 and 16 possible points for w on the second circle 507.

It can be seen that compared with the possible points for w in FIG. 4, the distance between the points is more evenly distributed.

If it is assumed that the probability of the two values of $\psi_{21}$ are equal, the total number of bits to represent w is 1+2=3 (first circle 506) and 1+4=5 (second circle 507) i.e. four bits on average.

Please note that the encoding of the vector components $r_1 e^{j\phi_{11}}$ and $r_2$ of the vector w as above may also be seen as an encoding of the vector ($\phi_{11}$, $\phi_{21}$, $\psi_{21}$, $\psi_{22}$) which, according to the representation of w with the help of Givens rotations, uniquely corresponds to w. Generally, a matrix may be encoded by encoding a matrix or vector of parameters which uniquely identify the matrix such as it is the case with the vector of parameters ($\phi_{11}$, $\phi_{21}$, $\psi_{21}$, $\psi_{22}$) which uniquely identifies w. As it is done in the above example where the number of bits assigned to the encoding of $\phi_{11}$ depends on the size of $\psi_{21}$, the method illustrated in FIG. 2 may be used to encode such a parameter vector.

As an example, table 4 shows bit assignments for a 2×1 beamforming vector $$\underline{w} = \begin{bmatrix} r_1 e^{j\phi_{11}} \\ r_2 \end{bmatrix} = \begin{bmatrix} \cos\psi_{21} e^{j\phi_{11}} \\ \sin\psi_{21} \end{bmatrix} \quad (17)$$

according to the traditional bit allocation method and the variable bit allocation method according to an embodiment of the invention. The column headed "remark" in table 3 gives a reference to tables 5, 6, or 7 respectively, in which it is specified how many bits are allocated to $\phi_{11}$ for each of the possible bit combinations for $\psi_{21}$ in the respective average feedback bit case.

TABLE 3

| Average Feedback bits: | Bits allocated | | | | |
|---|---|---|---|---|---|
| | Traditional Allocation | | Variable Allocation | | |
| | $^b\psi21$ | $^b\phi11$ | $^b\psi21$ | $^b\phi11$ (depending on $\psi21$) | Remark |
| 4 | 1 | 3 | 1 | 2, 4 | Table 4 |
| 6 | 2 | 4 | 2 | 5, 4, 4, 3 | Table 5 |
| 8 | 3 | 5 | 3 | 6, 6, 5, 5, 5, 5, 4, 4 | Table 6 |

The assignment of the number of bits is just an example, there could be another assignment that lead to better performance.

TABLE 4

| Bit representative of $\psi_{21}$ | Bits allocated for $\phi_{11}$, $b_{\phi_{11}}$ | Total number of feedback bits |
|---|---|---|
| 0 | 4 | 5 |
| 1 | 2 | 3 |

The possible values of $\psi_{21}$ corresponding to the possible bit combinations for $\psi_{21}$ in table 4 are $\frac{1}{8}\pi$ and $\frac{3}{8}\pi$ (in that order corresponding to the bit combinations given in table 4 from top to bottom).

TABLE 5

| Bit representative of $\psi_{21}$ | Bits allocated for $\phi_{11}$, $b_{\phi_{11}}$ | Total number of feedback bits |
|---|---|---|
| 00 | 5 | 7 |
| 01 | 4 | 6 |
| 10 | 4 | 6 |
| 11 | 3 | 5 |

The possible values of $\psi_{21}$ corresponding to the possible bit combinations for $\psi_{21}$ in table 5 are $\frac{1}{16}\pi$, $\frac{3}{16}\pi$, $\frac{5}{16}\pi$, and $\frac{7}{16}\pi$ (in that order corresponding to the bit combinations given in table 5 from top to bottom).

TABLE 6

| Bit representative of $\psi_{21}$ | Bits allocated for $\phi_{11}$, $b_{\phi_{11}}$ | Total number of feedback bits |
|---|---|---|
| 000 | 6 | 9 |
| 001 | 6 | 9 |
| 010 | 5 | 8 |
| 011 | 5 | 8 |
| 100 | 5 | 8 |
| 101 | 5 | 8 |
| 110 | 4 | 7 |
| 111 | 4 | 7 |

The possible values of $\psi_{21}$ corresponding to the possible bit combinations for $\psi_{21}$ in table 6 are $\frac{1}{32}\pi$, $\frac{3}{32}\pi$, $\frac{5}{32}\pi$, $\frac{7}{32}\pi$, $\frac{9}{32}\pi$, $\frac{11}{32}\pi$, $\frac{13}{32}\pi$, and $\frac{15}{32}\pi$ (in that order corresponding to the bit combinations given in table 6 from top to bottom).

For example, for average 4 bits feedback, in the traditional scheme, 1 bit is assigned for $\psi_{21}$ and 3 bits are assigned for $\phi_{11}$, while in the variable allocation scheme according to an embodiment of the invention, 1 bit is allocated for $\psi_{21}$ and 2 or 4 bits are assigned to $\phi_{11}$. The actual assignment (whether 2 bits or 4 bits) depends on the value of $\psi_{21}$ and is given in table 4. This example is the same as the one illustrated in FIGS. 4 and 5.

For the case of average feedback of 6 bits, depending on the value of $\psi_{21}$, which has four possible values since $b_{\psi_{21}}=2$, 5 bits, 4 bits, or 3 bits are assigned to $\phi_{11}$, according to table 5. Likewise, for the case of an average feedback of 8 bits, the actual bit assignment is given by table 6. The quantization and reconstruction of the $\psi$ and $\phi$ may be carried out based on (12) and (13).

As a further example, table 7 shows bit assignments for a 3×1 beamforming vector $$\underline{w} = \begin{bmatrix} r_1 e^{j\phi_{11}} \\ r_2 e^{j\phi_{21}} \\ r_3 \end{bmatrix} = \begin{bmatrix} \cos\psi_{21}\cos\psi_{31} e^{j\phi_{11}} \\ \sin\psi_{21}\cos\psi_{31} e^{j\phi_{21}} \\ \sin\psi_{31} \end{bmatrix} \quad (18)$$

e.g. for a MIMO system with three transmit antennas according to the traditional bit allocation method and the variable bit allocation method according to an embodiment of the invention. As in table 3, the column headed "remark" gives a reference to tables 9 or 10, respectively, in which it is specified how many bits are allocated to $b_{\phi_{11}}$ for each of the possible bit combinations for $\psi_{21}$ in the respective case.

As above, the assignment of the number of bits is just an example, there could be another assignment that lead to better performance.

TABLE 7

| Average Feedback bits: | Bits allocated | | | | | | | | |
|---|---|---|---|---|---|---|---|---|---|
| | Givens | | | | Proposed | | | | |
| | $^b\psi31$ | $^b\psi21$ | $^b\phi21$ | $^b\phi11$ | $^b\psi31$ | $^b\psi21$ | $^b\phi21$ | $^b\phi11$ | Remark |
| 8 | 1 | 1 | 3 | 3 | 1 | 1 | 2, 3, 4 | 2, 3, 4 | Table 8 |
| 12 | 2 | 2 | 4 | 4 | 2 | 2 | 3, 4, 5, 6 | 3, 4, 5, 6 | Table 9 |

TABLE 8

| Bit representative of | | Bits allocated for $\phi_{21}$ and $\phi_{11}$ | | Total number of feedback |
|---|---|---|---|---|
| $\psi_{31}$ | $\psi_{21}$ | $b_{\phi_{21}}$ | $b_{\phi_{11}}$ | bits |
| 0 | 0 | 3 | 4 | 9 |
| 0 | 1 | 4 | 3 | 9 |
| 1 | 0 | 2 | 3 | 7 |
| 1 | 1 | 3 | 2 | 7 |

The possible values of $\psi_{21}$ and $\psi_{31}$ corresponding to the possible bit combinations for $\psi_{21}$ and $\psi_{31}$ (0 and 1) in table 8 are 0.2967 and 0.8727.

TABLE 9

| Bit representative of | | Bits allocated for $\phi_{21}$ and $\phi_{11}$ | | Total number of feedback |
|---|---|---|---|---|
| $\psi_{31}$ | $\psi_{21}$ | $b_{\phi_{21}}$ | $b_{\phi_{11}}$ | bits |
| 00 | 00 | 3 | 6 | 13 |
| 00 | 01 | 4 | 5 | 13 |
| 00 | 10 | 5 | 4 | 13 |
| 00 | 11 | 6 | 3 | 13 |
| 01 | 00 | 3 | 5 | 12 |
| 01 | 01 | 4 | 4 | 12 |
| 01 | 10 | 4 | 4 | 12 |
| 01 | 11 | 5 | 3 | 12 |
| 10 | 00 | 3 | 5 | 12 |
| 10 | 01 | 4 | 4 | 12 |
| 10 | 10 | 4 | 4 | 12 |
| 10 | 11 | 5 | 3 | 12 |
| 11 | 00 | 3 | 4 | 11 |
| 11 | 01 | 3 | 4 | 11 |
| 11 | 10 | 4 | 3 | 11 |
| 11 | 11 | 4 | 3 | 11 |

The possible values of $\psi_{21}$ $\psi_{31}$ corresponding to the possible bit combinations for $\psi_{21}$ and $\psi_{31}$ (00, 01, 10, 11) in table 9 are 0.1396, 0.4363, 0.7156, and 1.0821.

For example, for average 8 bits feedback, the traditional scheme assigns 1 bits for $\psi_{21}$ and $\psi_{31}$, and 3 bits for $\phi_{11}$ and $\phi_{21}$, while in the variable allocation scheme according to an embodiment of the invention, 1 bit is assigned for $\psi_{21}$ and $\psi_{31}$ and 2, 3 or 4 bits are allocated for $\phi_{11}$. The actual assignment (whether 2 bits, 3 bits or 4 bits) depends on the value of $\psi_{21}$ and $\psi_{31}$ and is shown in table 8.

For 12 average feedback bits, the actual bit assignment is shown in table 9. The quantization and reconstruction of $\phi$ may be carried out based on (13). One difference from the two antennas case (i.e. 2×1 beamforming vector) is that the values of $\psi$ (as specified in tables 9 and 10) are not uniformly distributed as in (12).

Although in the embodiments described above, there is a focus on quantization of a beamforming vector, when there are two transmit antennas and two receive antennas, the feedback of a beamforming matrix can be carried out analogously to the feedback of a beamforming vector.

The variable bit allocation scheme described above can be applied directly to a scheme where a matrix is expressed using Givens rotation parameters (as in table 1). As additional information, information about the rule according to which the number of allocated bits is selected has to be stored, for example the information of tables 5 to 10. The variable bit allocation scheme can be considered as a hybrid of the traditional Givens rotation approach and a codebook based approach, since a code book is generated and used for the Givens rotation parameters $\phi$ and $\psi$. However, the variable bit allocation scheme has a lower storage requirement than traditional codebook-based feedback schemes.

The main differences between the variable bit allocation scheme described above and the traditional Givens rotation approach can be seen as:

The number of bits assigned to $\phi$ ($b_\phi$) is a function of $\psi$; and

The quantized value of $\psi$ may or may not be uniformly distributed.

Thus, according to one embodiment of the invention, a simple quantization scheme is provided for unit-norm beamforming vector based on variable feedback rate. The basic idea of this embodiment can be seen as giving higher resolution in dense areas and lower resolution otherwise. This can be directly applied to existing Givens rotation based feedback schemes by having the bits allocated to $\phi$ parameters (i.e. the parameters $\phi_{ji}$) to depend on the value of $\psi$ parameters (i.e. the parameters $\psi_{ji}$). Results show that the newly proposed scheme can achieve a lower mean square error and lower mean angular distance. The BER performance of the close-loop MIMO system based on the proposed quantization scheme also outperforms existing scheme.

This embodiment is not restricted to the use of eigen-beamforming or Givens rotations, which have only been used to give examples.

In one embodiment of the invention, due to the non-uniform distribution of the Givens Rotation parameters $\psi$, Huffman code is used to encode the Givens Rotation parameters $\psi$ and hence reduce the number of feedback bits required. Efficient source coding may be achieved in this way.

For example, it can be seen that for unitary 3×2 beamforming matrices the $\phi$ parameters have a uniform distribution from 0 to 360 degree (i.e. 0 to $2\pi$), while the $\psi$ parameters have a non-uniform distribution in the range of 0 to 90 degree (i.e. 0 to $\pi/2$). It can further be seen that the distribution of $\psi_{31}$ is not symmetric and the distribution of $\psi_{21}$ and $\psi_{32}$ is symmetric.

Due to the non-uniform distribution of the $\psi$ parameters Huffman code is used in one embodiment to encode the quantized parameters. For example, as shown in tables 11 and 12, it can be achieved in this way to represent the quantized version of $\psi_{21}$ (or $\psi_{32}$) and $\psi_{31}$ by only 1.94 bits and 1.77 bits (instead of 2 bits for a granularity of four).

TABLE 10

| Quantized value of $\psi_{21}$ and $\psi_{32}$ | Probability (i) | Huffman Code | Bits for $\psi_{21}$ or $\psi_{32}$, (ii) | Avg. bits for $\psi_{21}$ or $\psi_{32}$, (i) × (ii) |
|---|---|---|---|---|
| 11.25 | 0.14714 | 110 | 3 | 0.44142 |
| 33.75 | 0.35496 | 0 | 1 | 0.35496 |
| 56.25 | 0.35146 | 10 | 2 | 0.70292 |
| 78.75 | 0.14644 | 111 | 3 | 0.43932 |
| | | | | 1.93862 |

TABLE 11

| Quantized value of $\psi_{31}$ | Probability (i) | Huffman Code | Bits for $\psi_{31}$, (ii) | Avg. bits for $\psi_{31}$, (i) × (ii) |
|---|---|---|---|---|
| 11.25 | 0.2722 | 10 | 2 | 0.5444 |
| 33.75 | 0.47748 | 0 | 1 | 0.47748 |
| 56.25 | 0.2299 | 110 | 3 | 0.6897 |
| 78.75 | 0.02042 | 111 | 3 | 0.06126 |
| | | | | 1.77284 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The feedback information, for example the information that is used to generate the beamforming matrix V is transmitted from the receiver 102 to the transmitter 101 for example using the MIMO Control fixed field as it is illustrated in tables 12 and 13. The first lines of tables 12 and 13 give the bit numbers.

TABLE 12

| B0 | B1 | B2 | B3 | B4 | B5 | B6 | B7 | B8 |
|----|----|----|----|----|----|----|----|----|
| Nc index | | Nr index | | Channel width | Grouping (Ng) | | Coefficient size | |

TABLE 13

| B9 | B10 | B11 | B12 | B13 | B14 | B15 |
|----|-----|-----|-----|-----|-----|-----|
| Codebook information | | Remaining matrix segment | | | Reserved | |

There are altogether 6 octets (i.e. 48 bits) in the MIMO Control fixed field. Tables 12 and 13 show the first two octets which are followed by four octets including the sounding timestamp. Bits 9 and 10 are used for transmission of codebook information.

As explained above, the bits assignment for $\psi$ is depending on the value of $\phi$, e.g. when the value of $\phi$ is 0, two bits are assigned to $\psi$ and when the value of $\phi$ is 1, four bits are assigned to $\psi$.

For example, when the Codebook Information given by bit 9 and bit 10 is set to 00, 1 bit is assigned for $\phi$ and 2 or 4 bits are assigned for $\psi$ (average 4 bits per subcarrier) depending on the value of $\phi$.

An example for a bit allocation with examplary values for $\phi$ and $\psi$ that for example occurs according to this rule for four subcarriers is shown in table 14.

TABLE 14

| subcarrier 1 | | subcarrier 2 | | subcarrier 3 | | subcarrier 4 | |
|---|---|---|---|---|---|---|---|
| $\phi$11 | $\psi$21 | $\phi$11 | $\psi$21 | $\phi$11 | $\psi$21 | $\phi$11 | $\psi$21 |
| 0 | 1 | 0 | 1 | 1 | 1 | 0 | 1 | 1 | 0 | 1 | 0 | 1 | 0 | 1 | 0 |

The invention claimed is:

1. A method for encoding a data matrix having at least a first component and a second component wherein the value of the first component is determined;
   the number of bits to be used for encoding the second component is selected based on the value of the first component;
   the second component is encoded using the selected number of bits; and
   the first component is encoded.

2. The method according to claim 1, wherein the number of bits to be used for encoding the second component is selected based on the size of the first component.

3. The method according to claim 1, wherein the number of bits to be used for encoding the second component is selected based on the absolute value of the first component.

4. The method according to claim 1, wherein the data matrix is a data vector.

5. The method according to claim 1, wherein the first component and the second component comprise angle information.

6. The method according to claim 1, wherein the second component is a parameter including angular information of a representation of the data matrix or another data matrix.

7. The method according to claim 6, wherein the representation is a representation according to Givens rotations.

8. The method according to claim 1, wherein the data matrix comprises channel state information.

9. The method according to claim 8, wherein the data matrix is a beamforming matrix.

10. The method according to claim 1, wherein the data matrix is encoded by a receiver of a communication system to be transmitted to a transmitter of the communication system.

11. The method according to claim 10, wherein the communication system is a multiple-input multiple-output communication system.

12. An encoder for encoding a data matrix having at least a first component and a second component comprising
    a determining circuit configured to determine the value of the first component;
    a selecting circuit configured to select the number of bits to be used for encoding the second component based on the value of the first component;
    a first encoding circuit configured to encode the second component using the selected number of bits; and
    a second encoding circuit configured to encode the first component.

13. The encoder according to claim 12, being part of a transceiver.

14. The encoder according to claim 13, being part of a multiple-input multiple-output transceiver.

15. A method for decoding an encoded first component and an encoded second component of an encoded data matrix wherein the encoded first component is decoded;
    the value of the first component is determined;
    the number of bits which was used for encoding the second component is determined based on the value of the first component; and
    the encoded second component is decoded using the determined information what number of bits was used for encoding the second component.

16. A decoder for decoding an encoded first component and an encoded second component of an encoded data matrix comprising
    a first decoding circuit configured to decode the encoded first component;
    a first determining circuit configured to determine the value of the first component is determined;
    a second determining circuit configured to determine the number of bits which was used for encoding the second component based on the value of the first component; and
    a second decoding circuit configured to decode the encoded second component using the determined information what number of bits was used for encoding the second component.

17. A computer program product, which, when executed by a computer, makes a computer perform a method for encoding a data matrix having at least a first component and a second component wherein
- the value of the first component is determined;
- the number of bits to be used for encoding the second component is selected based on the value of the first component;
- the second component is encoded using the selected number of bits;
- the first component is encoded.

* * * * *